United States Patent [19]

Kanai et al.

[11] Patent Number: 5,026,265
[45] Date of Patent: Jun. 25, 1991

[54] MULTI-INJECTION MOLDING MACHINE FOR MOLDING A MULTI-INJECTION BODY

[75] Inventors: Toshiyuki Kanai; Nobuo Shinnoh, both of Sakaki, Japan

[73] Assignee: Nissei Jushi Kogyo Kabushiki Kaisha, Nagano, Japan

[21] Appl. No.: 380,460

[22] Filed: Jul. 17, 1989

Related U.S. Application Data

[62] Division of Ser. No. 347,908, May 5, 1989, abandoned.

[30] Foreign Application Priority Data

May 11, 1988 [JP] Japan .................. 63-114453

[51] Int. Cl.$^5$ .................. B29C 45/16
[52] U.S. Cl. .................. 425/127; 264/328.7; 264/328.8; 264/328.11; 425/130; 425/134; 425/572; 425/574
[58] Field of Search .............. 425/112, 116, 121, 127, 425/130, 134, 572, 573, 574, 575, 581, 588, 576, 129.1; 264/328.7, 328.8, 328.11, 297.2; 249/83, 144

[56] References Cited

U.S. PATENT DOCUMENTS 3,807,920  4/1974  Aoki .................. 425/134

FOREIGN PATENT DOCUMENTS 60-52322   3/1985  Japan .
63104809   5/1985  Japan .

Primary Examiner—Timothy Heitbrink
Attorney, Agent, or Firm—Birch, Stewart, Kolasch & Birch

[57] ABSTRACT

A multi-injection molded body made of at least a first and a second resin is molded, an undercut is formed generally by pressing a part of the surface about an aperture opening formed in a first molded body made of the first resin to project interior side wall faces of the aperture inward, and injecting a second resin to mold a second molded body in the aperture. The multi-injection molded body thus formed has an undercut in the aperture, so that the second molded body is tightly fixed to the first molded body. A multi-injection molding machine for producing the first and second molded bodies is also provided.

6 Claims, 14 Drawing Sheets

FIG. 2(a)
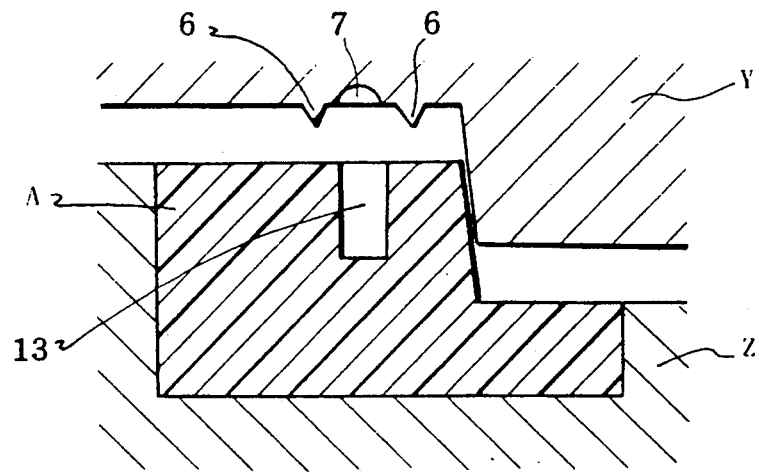
FIG. 2(b)
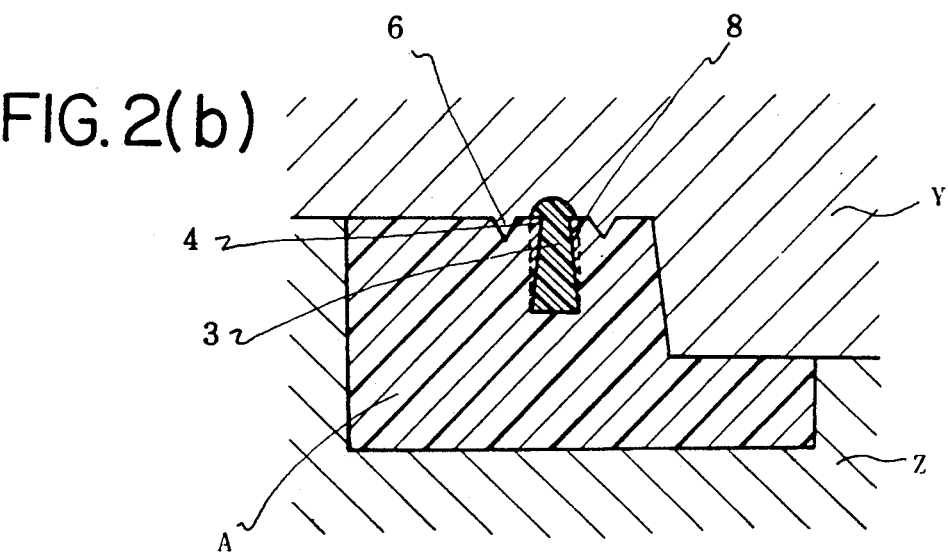
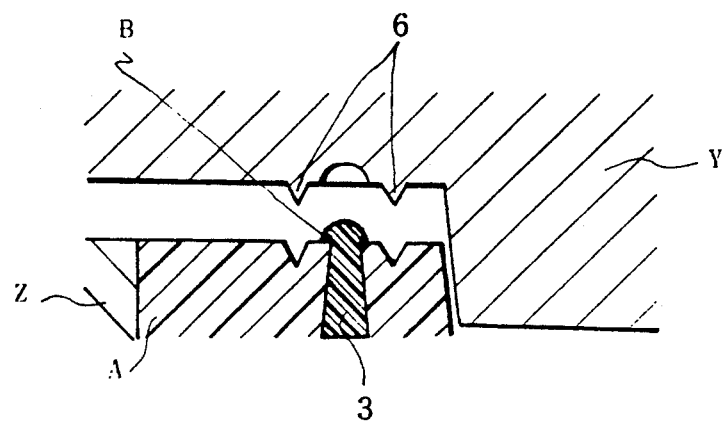
FIG. 2(c)

FIG. 3(a)
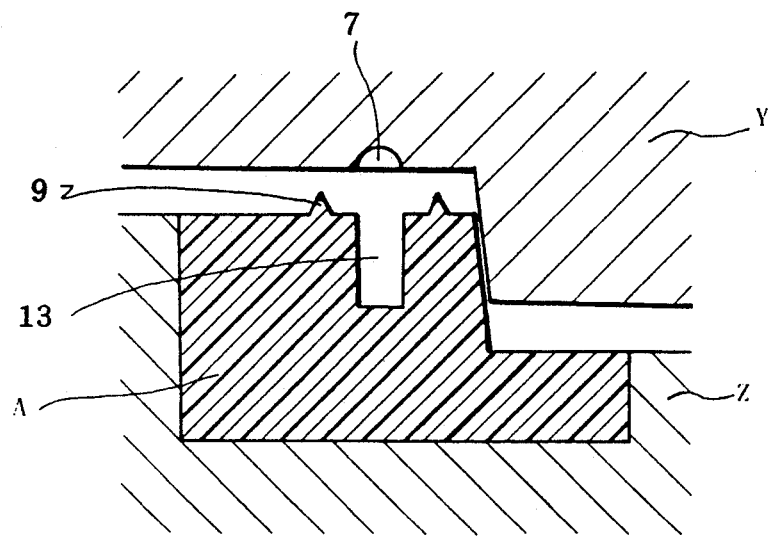
FIG. 3(b)
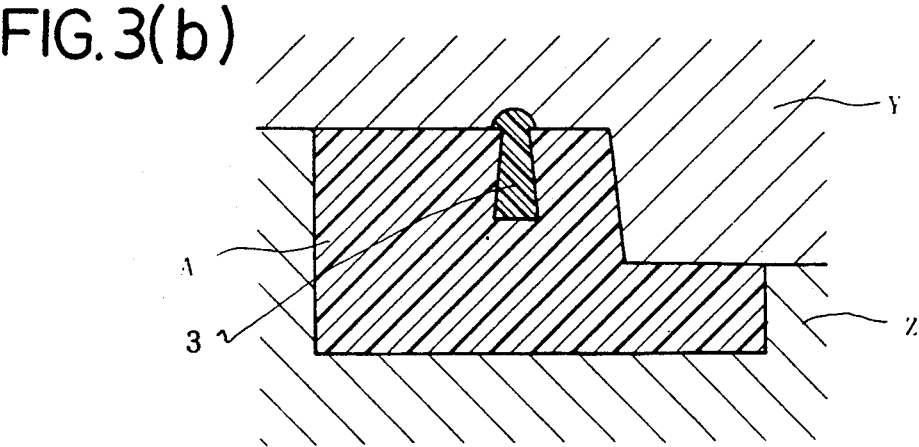
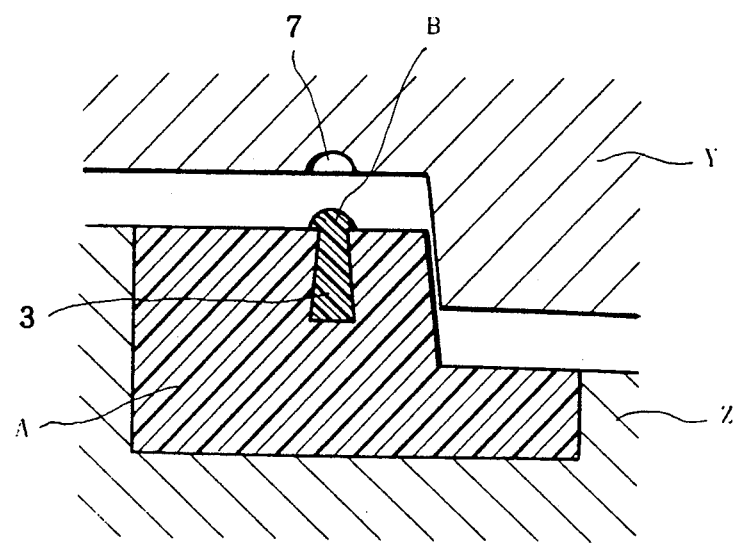
FIG. 3(c)

FIG.7(a)
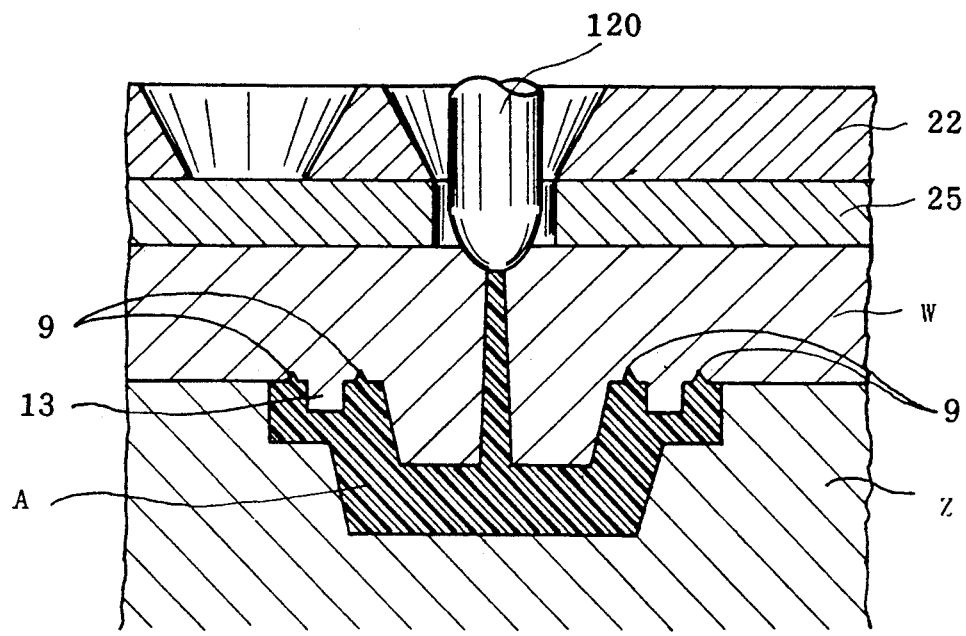
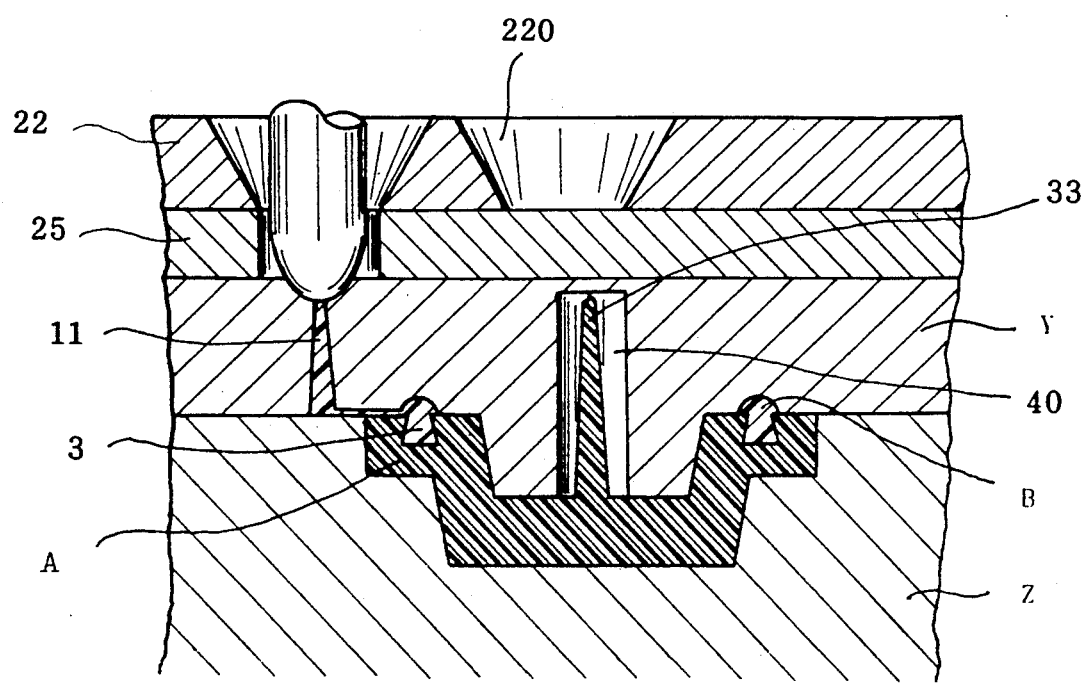
FIG. 7(b)

FIG. 15(a)
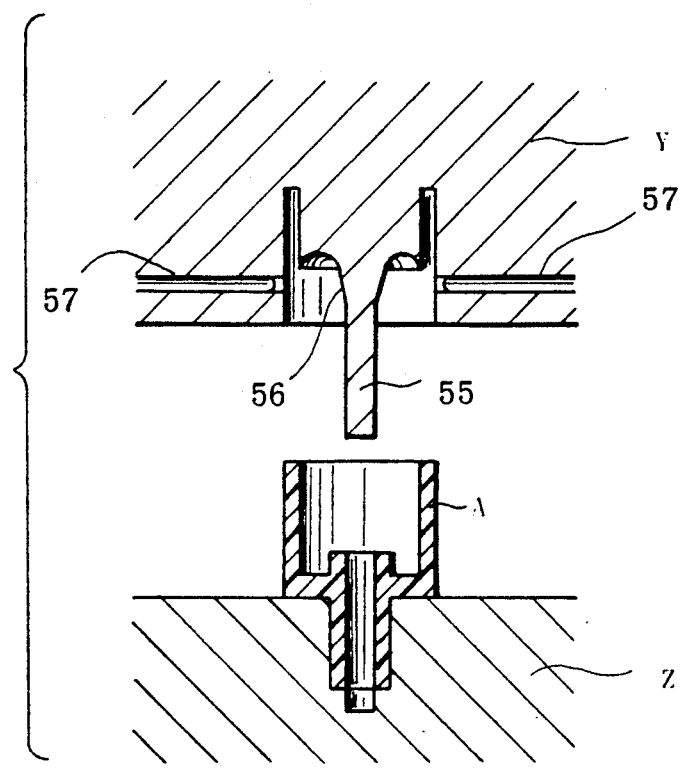
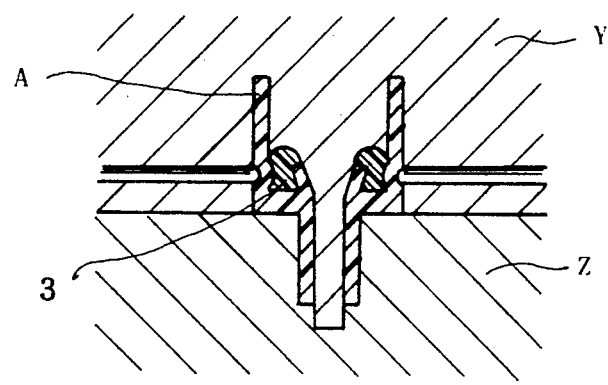
FIG. 15(b)

MULTI-INJECTION MOLDING MACHINE FOR MOLDING A MULTI-INJECTION BODY

This application is a divisional of copending application Ser. No. 07/347,908, filed on May 5, 1989 now abandoned.

FIELD OF THE INVENTION

The present invention relates to a multi-injection molded body, a method of molding said body, and a multi-injection molding machine. More precisely it relates to a multi-injection molded body consisting of two or more kinds of resins, a method of molding said body, and a multi-injection molding machine said body.

BACKGROUND OF THE INVENTION

Recently, cars, home electric appliances, cameras, containers, etc. are required to be lighter in weight. As such, various elements of machines, appliances, etc have been changed from metal to plastic.

Parts made of plastic consist of a plurality of molded bodies (described as first a molded body or bodies in the following description), and sealing parts (described as a second molded body or bodies in the following description). Sealing parts are made of such elastic polymers as silicon gum, urethane gum, styrene-butadiene gum, etc., and are used in assembling sections between parts made of plastics so as to provide sealing, absorbing or nonskid capabilities for products manufactured therewith.

Conventionally, the second molded bodies are independently molded from the first molded bodies, and then they are manually assembled into the first molded bodies. In such a method, there are disadvantages of lower assembly precision and increasing assemblying steps. To solve these disadvantages, there was disclosed a method of multi-injection molding in Japanese Provisional Publication (Kokai) Gazette No. 60-52322 and Japanese Provisional Publication (Kokai) Gazette No. 63-104809 This method comprises the steps of molding a first molded body having an aperture on the surface thereof by injection molding, and injecting an elastic polymer for forming a second molded body in the slot or channel. In this conventional method, multi-injection molded bodies consisting of the first molded body and the second molded body are molded in one injection molding step, so that assembling precision can be increased, and assembling steps can be reduced.

In the above conventional method, first molded bodies are molded by injection molding, and the walls of the apertures are formed approximately vertical from the bottom faces thereof, in order that one can easily remove products from the molding machines. But in the above method, the second molded bodies, molded in the apertures of the first molded bodies, can also be easily pulled out of the first molded bodies because no way is provided for engaging on the side wall faces of the apertures. In order to fix second molded bodies in the channels of the first molded bodies, as disclosed in the gazett No. 63-104809, reactive elastomer layers, primer layers, etc. are formed between the inner bottom faces of the apertures of the first molded bodies and the botton faces of the second molded bodies, causing them to adhere together.

OBJECT AND SUMMARY OF THE INVENTION

The object of present inventionis to provide multi-injection molded bodies, which consist of a first and a second molded body molded by injection molding, wherein the second molded bodies are tightly fixed in the apertures of said first molded bodies without utilizing adhering layers disposed therebetween. A method of molding the bodies and a multi-injection molding machine for molding the bodies are also provided.

According to the present invention it has been found that catching (or holding) means can be formed on the side wall faces of the apertures of the first molded body by the steps of forming an undercut section, by pressing upon the rim, or interior walls of the aperture, to project the rim area of the side walls towards the inside of the apertures, and then injecting a resin melt for forming the second molded body into the aperture of the first molded body, so that the second molded body can be tightly fixed to the first molded body.

The present invention provides that, in a multi-injection molded body formed by at least two kinds of resin such as a first resin and a second resin, and comprising a first molded body A made of the first resin, and a second molded body B made of the second resin; and the multi-injection molded body being characterized in that at least a part of an aperture section 3, which is formed on a joint face of the first molded body A joining the second molded body B, is projected toward the inside of said aperture section 3 to form an undercut section, and the second resin is filled in the aperture section 3 forming a part of the second molded body B.

The present invention further provides a multi-injection molding method to mold a multi-injection molded body formed by at least two kinds of resin, such as a first resin, and a second resin and comprising a first molded body A made of the first resin and a second molded body B made of the second resin characterized in that the first molded body A has an aperture 13 on the joint face thereof joining the second molded body B, an undercut section is formed by pressing at least a part of the rim of the aperture 13 to project the walls of the aperture 13 toward the inside thereof to form an undercut section 5, then the second resin melt is injected into the aperture section 3 and a cavity 7 of a mold Y or Y'.

The present invention furthermore provides an injection molding machine for a multi-injection molded body formed by at least two kinds of resin, such as a first resin and a second resin, and comprising a first molded body A made of the first resin, and a second molded body B made of the second resin, wherein a pair of first molds Z and W for molding the first molded body A have an aperture 13 on the joint face thereof joining to the second molded body B, and a second mold Y has a pressing section for pressing at least a part of the area about the rim of the aperture 13 of the first molded body A to project the side walls of the aperture 13 toward the inside thereof to form an undercut section 5, and a pair of third molds Y or Y' and Z are provided for injecting the second resin melt in a cavity 7, which accommodates the first molded body A and which molds the second molded body B, including the aperture section 3 of the first molded body A.

The method of the present invention, further provides for forming the undercut section 5 in the aperture section 3 of the first molded body A. This can be easily achieved by pressing the area about the rim of the aperture 13 of body A with projected sections 6 of a second mold Y, or by pressing a projected section 9 previously formed in the vicinity of the aperture 13, or by pressing at least a part of walls exterior to the aperture 13. Additionally, if injection of the second resin melt for molding the second molded body B is executed with pressing all parts of the rims of the aperture section 3, flashes easily formed in the vicinity of the second molded body B are effectively prevented even in cases where the second resin is a material with small surface tension, such as silicon gum, etc.

In the injection molding machine of the present invention, if the pressing sections of the mold Y are formed as projecting sections 6, or are capable of pressing at least a part of the exterior walls to the aperture 13, the undercut section 5 can be easily formed in the aperture section 3. For example, even in a pair of first molds Z and W (FIG. 7a) for molding the first molded body A, the cavities have projecting sections 9 in the vicinity of the aperture 13. If the projecting sections 9 of the first molded body A are pressed, the undercut sections 5 can be easily formed in the aperture 13. In such a case, it is preferred to have one of a pair of molds Z and W, in which the first molded body A is left when the molds are opened, and then making common use of the mold Z by combining with a second mold Y (FIG. 7b) having a pressing section to form the undercut section 5 in the aperture section 3 of the first molded body A, or to a mold, which accommodates the first molded body A, and wherein a pair of molds forms the second molded body B. It is also, especially preferred that the pressing sections for pressing all parts of the rim of the aperture 13 are provided, such as in the mold Y or Y' (FIG. 16) into which the second resin for molding the first molded body A is injected, since they are capable of pressing all parts of the rim of the aperture section 3 while injecting the second resin into the aperture section thereof, so that flashes easily formed during molding the second molded body B are effectively prevented.

The present invention is especially preferred in cases wherein the two resins are non-compatible, and wherein the second resin is an elastic polymer for providing sealing, absorbing, or nonskid properties, etc. to the article produced.

Note that, the words "undercut section" as applied to aperture section 3 means at least a portion thereof whose width of space is narrower than the width of the bottom face of the aperture section 3.

In the present invention, the undercut section 5 may be formed in the aperture section 3 by pressing about the surface of the rim area of the aperture section opening of the first molded body A to form a catching means for catching the second molded body B. The second resin for molding the second molded body B is then injected into the aperture section 3, so that the second molded body B is tightly fixed in the aperture section 3 of the first molded body A. Alternatively the undercut section 5 of the aperture section 3 of the first molded body A, may be easily formed by clamping a third mold Z, accommodating the first molded body A, and a second mold Y having a pressing section for pressing in the vicinity of the opening of the aperture 13 of the first molded body A.

BRIEF DESCRIPTION OF THE DRAWINGS

Embodiments of the present invention will now be described by way of example with reference to the accompanying drawings, wherein:

FIGS. 2(a), 2(b), and 2(c) illustrate a method for forming the aperture and undercut in the first molded body and the formation of the second molded body;

FIGS. 3(a), 3(b) and 3(c) illustrate a modified embodiment of the method for forming the undercut of FIGS. 2(a), 2(b), and 2(c);

FIGS. 7(a) and 7(b) illustrate an alternate embodiment of the multi-injection molding machine of FIGS. 6(a) and 6(b);

FIGS. 15(a) and 15(b) illustrate an alternate embodiment combining the double-pipe methods of FIGS. 13(a) and 13(b) and FIGS. 14(a) and 14(b);

DETAILED DESCRIPTION OF PREFERRED EMBODIMENTS

The present invention will now be explained with reference to drawings.

Figure 1A:
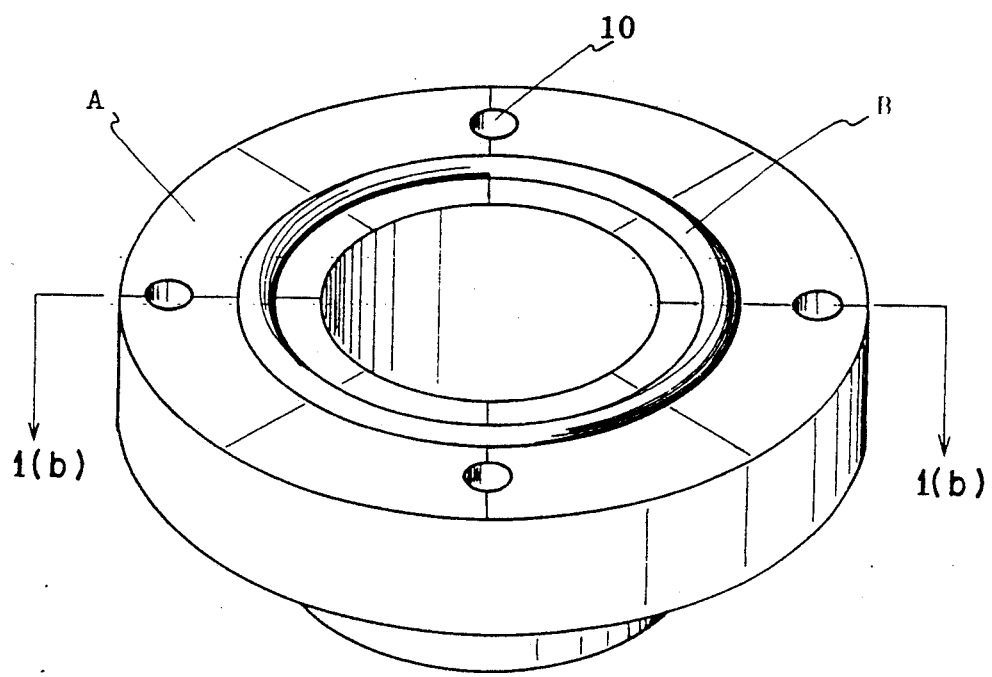
FIGS. 1a and 1b show a perspective view and a sectional view respectively of an embodiment of the multi-injection molded body of the present invention.
Figure 1B:
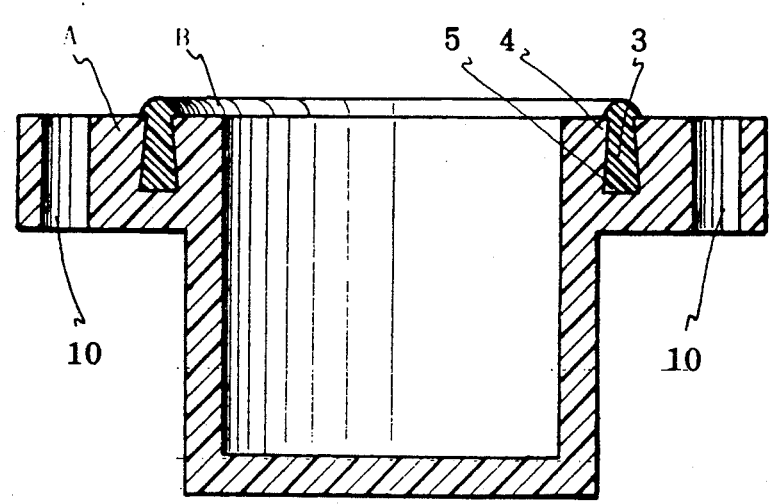

FIG. 1(a) shows a perspective view of an example of the multi-injection molded bodies of the present invention, and FIG. 1(b) shows a sectional view of the multi-injection molded body of FIG. 1 taken along the line 1(b)—1(b) of FIG. 1(a).

In FIG. 1b, in a flange section of a first molded body A which is made of a first resin (e.g. nylon-6 including glass fiber), a seal ring as a second molded body B made of a second resin (e.g. silicon gum) is provided and a plurality of holes 10 are bored therein.

An aperture section 3 is formed on the joint face of the first molded body A joining the second molded body B. The upper section of the walls of the aperture section 3 is narrower than the lower section thereof, so the sectional shape of the aperture section 3, as shown in FIG. 1(b), is a so-called "inverted-tapered shape"

wherein the width of the opening 4 of the aperture section 3 has the narrowest dimension; and wherein the width of the bottom section of the aperture section 3 has the widest dimension. Therefore, the section 5 is formed as the undercut section. In the aperture section 3, silicone gum as the second resin is filled therein, and the second resin forms a part of the second molded body B. Therefore, a part of the second molded body is attached in the aperture section 3 having the undercut section in the bottom section 5, so the projecting section of the opening 4 of the aperture section 3 is formed as a catching means to engage the second molded body B, so that the second molded body B is tightly fixed in the aperture section 3 by the undercut section.

The multi-injection molded body A is molded by the method shown in FIG. 2a–2c.

Namely, the first molded body A having the aperture 13 is left in a mold Z of a pair of molds for molding the first molded body A [see FIG. 2(a)]. The aperture 13 of the first molded body A is opened at the upper face thereof. The sectional shape of the aperture 13, as shown in FIG. 2(a), is a rectangle and its side walls are formed approximately vertical to the inner bottom face of the aperture 13, so that another mold, which molds the first molded body A with the mold Z, can easily be removed from the first molded body A during the mold opening, so that the first molded body A can be left in the mold Z.

Next, a surface area about the rims of the first molded body A is pressed by clamping a mold Y, which has projecting sections 6 and a cavity 7 for molding the second molded body, and the mold Z in which the first molded body A has been retained therein [FIGS. 2(a), (b)].

Both side walls of the aperture 13 project inward. The length of the projections are, as shown by numeral 8 in FIG. 2(b), wherein the width of the upper section is larger than the width of the lower section. The sectional view of the aperture section 3 has an inverted-tapered shape forming an undercut section in the vicinity of the bottom section 5 of the transformed aperture section 3. Thus a catching (or holding) means is formed at opening 4 of the aperture section 3.

Next, the second resin is injected into the aperture section 3 and the cavity 7 of the mold Y, and then the molds Y and Z are opened to obtain a multi-injection molded body consisting of the first molded body A and the second molded body B which is tightly fixed to molded body A by the aperture section 3 [FIGS. 2(b), (c)].

Appropriate second resins, e.g. silicone gum, for molding the second molded body B, may possess a low surface tension.

However, there is also the disadvantage that, when the second resin has a low surface tension, the second resin can enter quite narrow gaps (e.g. 5μ), thereby easily forming flashes around the second molded body B.

In this embodiment, the sealing ability around the aperture section 3 can be greatly increased by pressing all parts of the rim of the aperture section of the first molded body A with the projecting sections 6 of the mold Y during injection of the second resin into the aperture section 3 and the cavity 7, so that the formation of flashes around the second molded body B can be prevented.

The undercut section can be formed by another method, as shown in FIGS. 3a–3c

First, projecting sections 9 are preliminarily formed in the vicinity of the opening of aperture 13 [FIG. 3(a)]. The projecting sections 9 are pressed by the bottom face of a mold Y having a cavity 7 for molding the second molded body [FIG. 3(a), (b)]. In this method, the pressed mark on the upper face of the first molded body A can be smaller than the method of pressing by the projecting sections 6 of the mold Y shown in FIGS. 2 [FIG. 3(b), (c)].

The methods shown in FIGS. 2a–3c can be combined. This embodiment is shown in FIGS. 4a–5b.

Figure 4A:
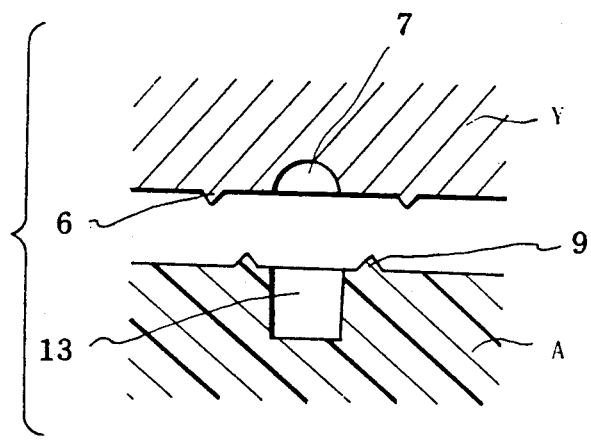
FIGS. 4(a) and 4(b) illustrate an alternate embodiment which combines the methods of FIGS. 2(a), 2(b), 2(c), 3(a), 3(b), and 3(c).
Figure 5A:
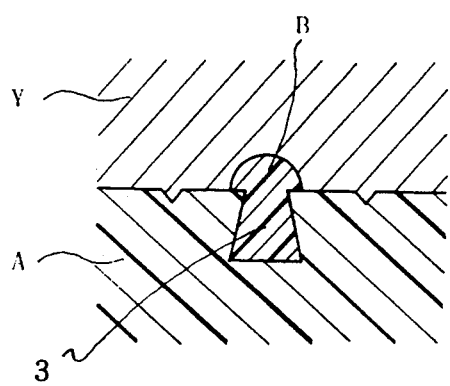
FIGS. 5(a) and 5(b) illustrate an alternate embodiment of the method of FIGS. 4(a) and 4(b)
Figure 4B:
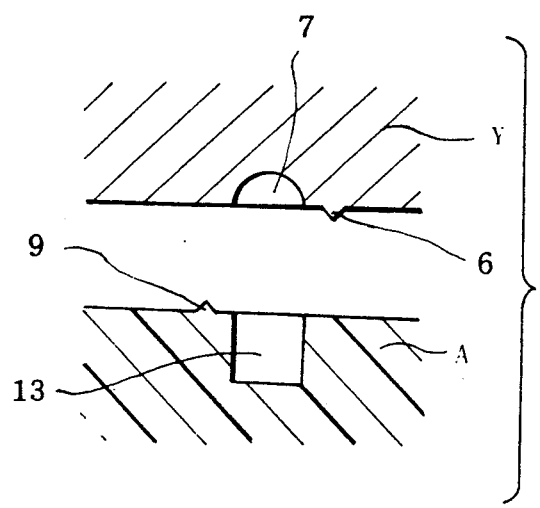
Figure 5B:
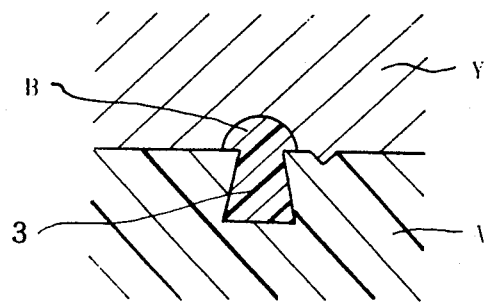

FIGS. 4a and 4b shows the method of doubly pressing the rim of the opening of aperture 13 of the first molded body A and the projecting sections 9, which are preliminarily formed in the vicinity of the opening of the aperture 13. FIGS. 5a and 5b show the method of pressing each side of the opening of the aperture 13. In the above stated methods, the projecting length of the wall of the aperture 13 of the method shown in FIGS. 5(a) and 5(b) can be the longest among them. Note that, in the above stated embodiments, the sectional shape of the aperture 13 has a rectangular configuration, but the same is not necessary if the mold, which molds the first molded body A, can be easily removed from the first molded body A. Thus the sectional shape of the aperture 13 may be drawable-tapered shape, a half circle, a half ellipse, or the like.

Figure 6A:
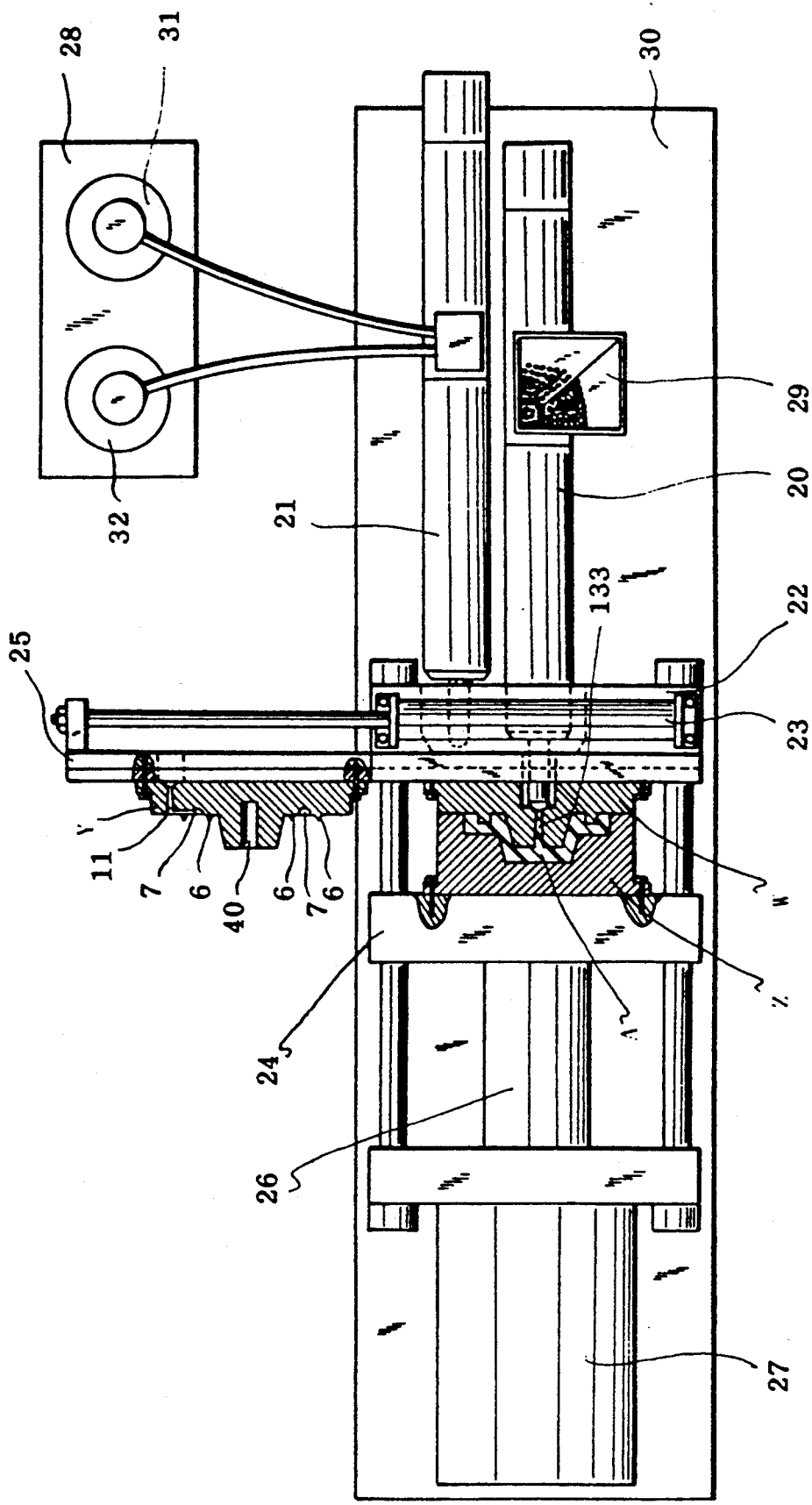
FIGS. 6(a) and 6(b) illustrate a multi-injection molding machine for performing the methods of the present invention.
Figure 6B:
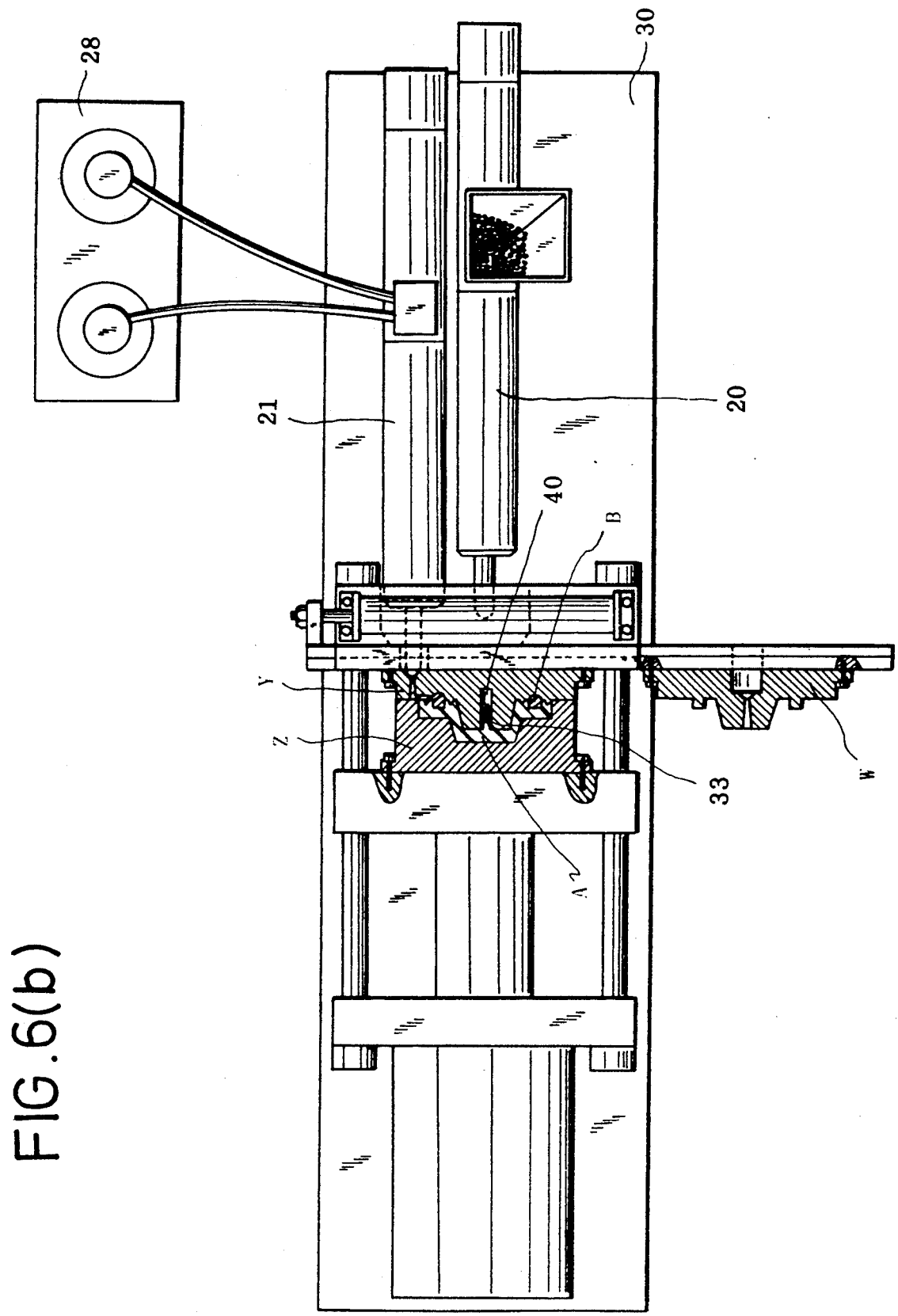

Additionally, the sectional shape of the projecting section 6 of the mold Y may have a wedge shape, a half circle shape, a half ellipse shape, trapozoid shape, etc. The projecting section 6 and/or 9 may be provided around the rim of the aperture 13 of the first molded body A to press all of the rim, but may also be provided to only press a part of the rim of the aperture 13. Either way, the projections are required to press in the vicinity of the opening of the aperture of the first molded body A to force the walls of the aperture inward. If the mold Y can tightly contact the first molded body A, which is left in the mold Z, except for the aperture the walls of the aperture can be easily forced inward during clamping of the molds Y and Z so as to press the rim of the aperture 13 of the first molded body A, and thus form the undercut section. The mold Y, as shown in FIGS. 6(a) and 6(b) may have an injection hole 11, through which the second resin for molding the second molded body B is injected into the cavity 7. Note that, the injection hole 11 may be provided in a mold apart from the mold Y.

FIGS. 6(a) and 6(b) show a multi-injection molding machine for molding the multi-injection molded bodies of the present invention.

The injection molding machine shown in FIG. 6(a) has a first injection device 20 and a second injection device 21 on a base 30. Molds W, Y and Z are provided between a movable board 24 and a fixed board 22. The mold Z is fixed with bolts on the movable board 24 which is moved by a clamping piston 26 slidably attached in a clamping cylinder 27. The mold Z can be closed, clamped or opened with the mold W or Y which are fixed with bolts on a slide board 25. The slide board 25 is slid by an oil cylinder 23 which is provided on the fixed board 22. The board can slide between the position where the mold Z is closed or clamped with the mold W, and the position where the mold Z is closed or clamped with the mold Y.

In the injection molding machine shown in FIG. 6, after the molds Z and W were clamped by moving the movable board 24 toward the right with the movement of the clamping piston 26, the first injection device 20 advances, and the nylon-6 melt including glass fiber is injected into a cavity, which is formed by the molds Z and W, for molding the first molded body.

Pellets of nylon-6 including glass fiber, which are provided through a hopper 29 mounted on the first injection device 20, are melted in the first injection device 20.

After solidification of the injected nylon-6 and moving back the first injection device 20, the movable board 24 is moved to the left to open the molds Z and W. During the opening of the mold, the aperture 13 of the first molded body A opens on the upper face thereof, and the first molded body A is left in the mold Z.

Next, the first molded body A left in the mold Z, as shown in FIG. 6(b), is closed and clamped to the mold Y which is moved by sliding the slide board 25. As shown in FIG. 6(a), projecting sections 6 are disposed around the cavity 7 for molding the second molded body. Additionally the injection hole 11 is provided for injecting a second resin such as silicon gum into the cavity 7. There is provided a channel section 40 in approximately center of the mold Y. As shown in FIG. 6(b), the channel section 40 accommodates a sprue 33 formed on the first molded body A during closing of the molds Z and Y. Note that, the sprue 33 is the solidified first resin filled in a resin path 133 connecting the front end of the nozzle of the first injection device with the cavity for molding the first molded body.

The projecting sections 6 of the mold Y press the rim of the aperture of the first molded body A, to transform the aperture 13 into aperture section 3 having an inverted-tapered shape. The second injection device 21 is advanced and a second resin such as a silicon gum, is injected into aperture section 3 and cavity 7 to mold the second molded body B.

Silicon gum may be provided from a pot 31 of a seal supplier 28 to the second injection device 21, and hardening agents may also be provided from a pot 32 thereof to the second injection device 21. Both are mixed in the second injection device 21 and injected into the aperture section 3 and the cavity 7. The second resin injected is solidified in the aperture section 3 and the cavity 7. The second resin is generally a thermosetting resin, so that cooling the second injection device 21 and heating the temperature of the mold Y to about 120°-150° C. permits immediate solidification of the second resin in the aperture section 3 and the cavity 7 without solidification in the second injection device 21. Within the above temperature range for the mold Y, such temperatures do not affect the choice of nylon-6 as a first thermoplastic resin, since the mold W for molding the first molded body A is preferably kept at a temperature of about 80°-90° C. to immediately solidify the first resin.

In the injection machine shown in FIG. 6(b), the rim of the aperture 13 of the first molded body A is pressed by the projecting section 6 of the mold Y. FIGS. 7a and 7b show another embodiment. The machine shown in FIGS. 7a and 7b is the same as the machine shown in FIGS. 6(a) and 6(b), but in the machine of FIGS. 7a and 7b, the mold Z and nozzles 120 and 121 can move horizontally during mold clamping and mold opening. Note that, their movement are shown as up and down in FIGS. 7a and 7b but they can also move in horizontal direction. As shown in FIG. 7(a), the first resin melt is injected into the cavity for molding the first molded body formed by the molds Z and W from the nozzle 120 of the first injection device 20, so that the projecting sections 9 are formed in the vicinity of the rim of the aperture 13 of the first molded body A.

Next, after opening molds W and Z, the mold Z in which the first molded body A (having the projecting sections 9) has been left and the mold Y (which has moved by sliding the slide board 25) are clamped, so that the projecting sections 9 of the first molded body A are pressed by the bottom face of the mold Y. At such a point, the sectional shape of the aperture 13 is transformed into the inverted-tapered shape to form the aperture section 3 having an undercut section. Then the second resin is injected into the aperture section 3 and the cavity for molding the second molded body B. The second resin is injected via the nozzle 121 of the second injection device 21 and the injection hole 11 [FIG. 7(b)]. The mold Y has, as shown in FIG. 7(b), the channel section 40 accommodating the sprue 33 formed on the first molded body A, so that clamping the molds Z and Y can be executed without cutting the sprue 33.

Figure 8:
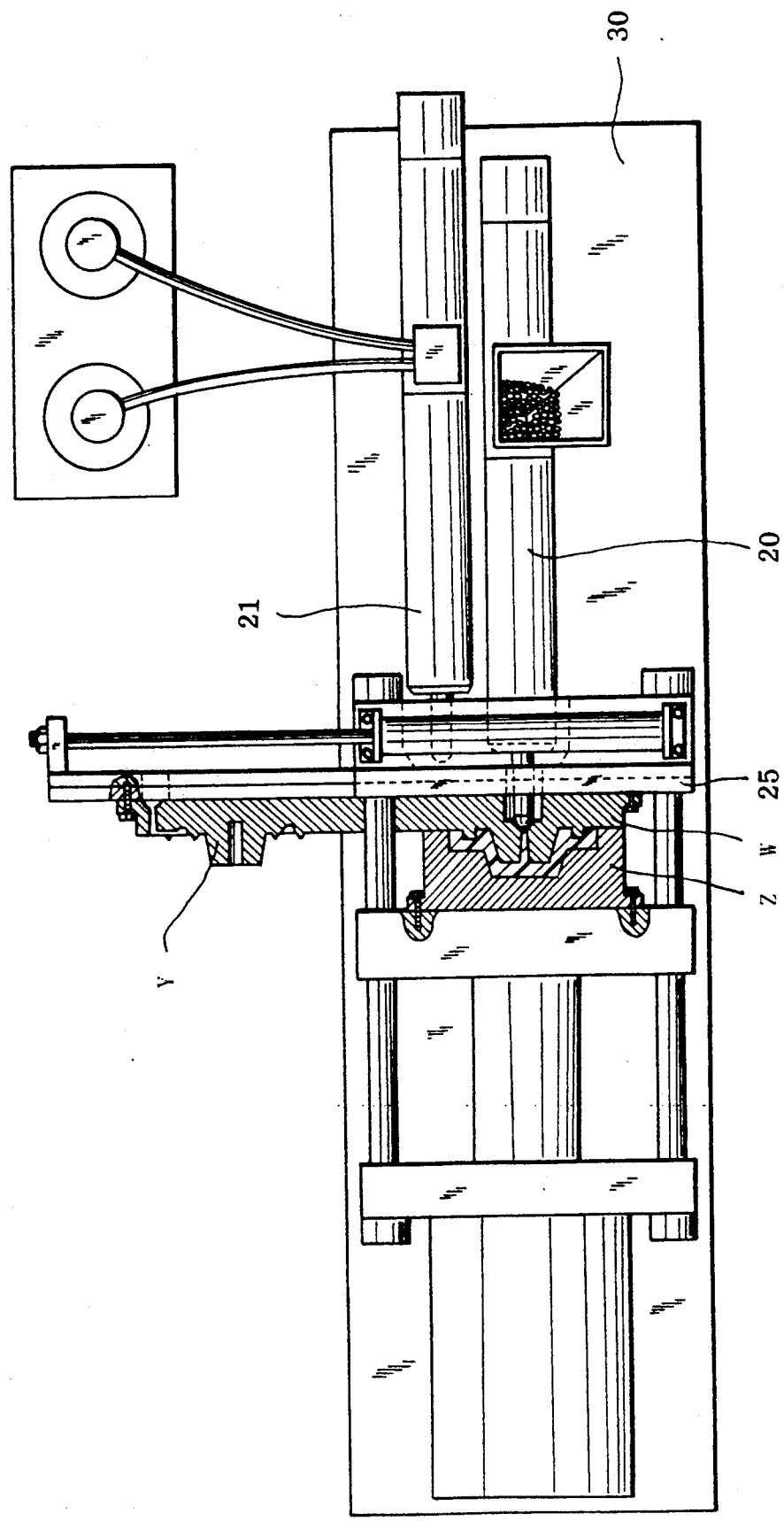
FIG. 8 illustrates another alternate embodiment of the multi-injection molding machine of FIGS. 6(a) and 6(b)

In the machine shown in FIGS. 6(a) and 6(b), the molds W and Y are respectively fixed with bolts on the slide board 25. The molds W and Y may as shown in FIG. 8, however, also be in one body, that single body also having a base connecting the two molds. Note that, the slide board 25 can be substituted by a rotating verses sliding board. The rotary board 25 is rotated to move the molds W and Y to a position for closing with and being clamped with the mold Z.

In the above described embodiments, both sides of the rim of the aperture 13 on the upper face of the first molded body A are pressed to transform the sectional shape. If at least one of walls of the aperture 13 is thin, it may be impossible to transform the sectional shape of the aperture 13 by pressing upon both sides of its rim. In that case, the following methods are adaptable.

Figure 9A:
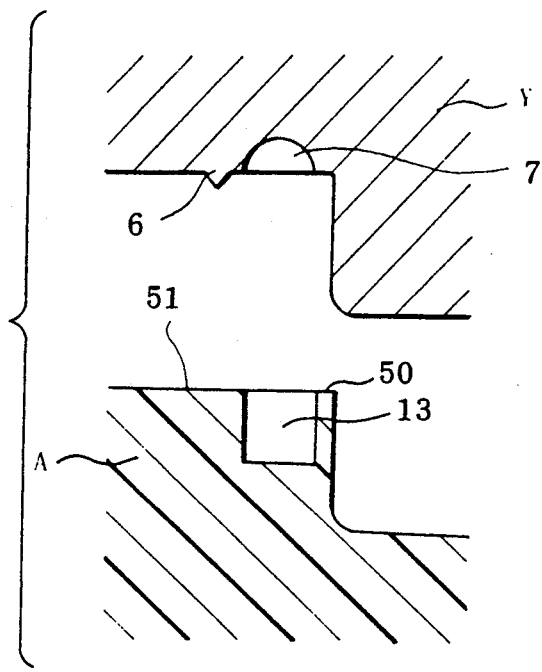
FIGS. 9(a) and 9(b) illustrate a method for forming the aperture and undercut where the first molded body has a thin wall.
Figure 10A:
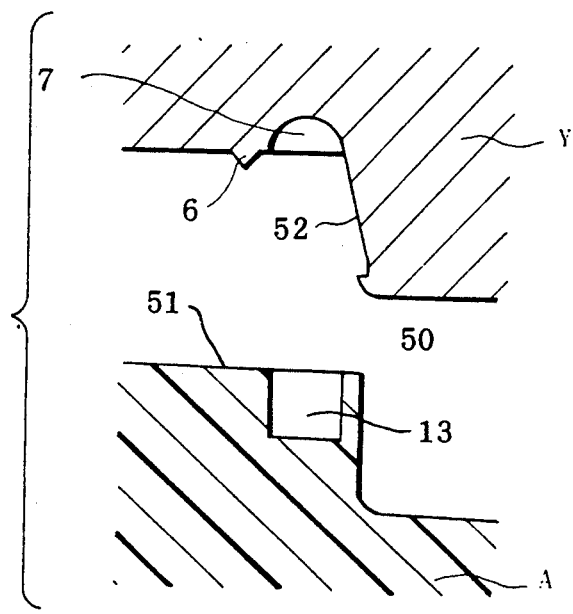
FIGS. 10(a) and 10(b) illustrate an alternate embodiment of the method of FIGS. 9(a) and 9(b)
Figure 9B:
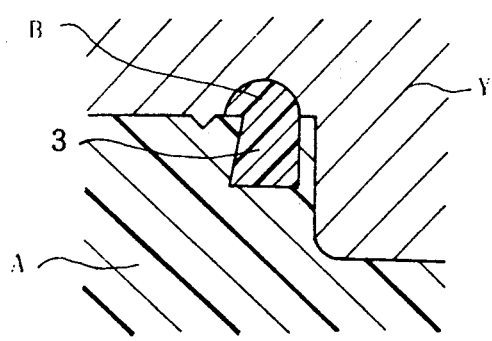
Figure 10B:
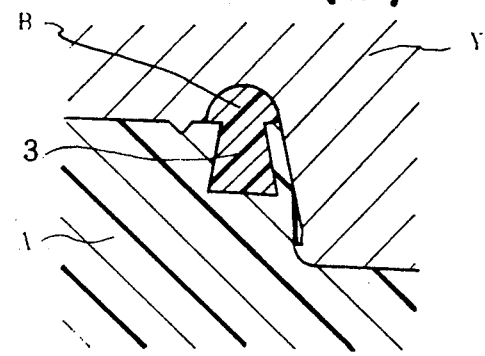

The embodiments shown in FIGS. 9(a), 9(b), 10(a) and 10(b) are those where one of the sides (numeral 50 in FIG. 9(a) of the aperture 13 is thin, making it impossible to press on this area. In this case, it is possible to press the upper surface of the side 51 to form the undercut section in the aperture 13. In FIG. 10(a), the face 52, which contacts the thin side 50, is inclined to press the side 50 inward toward the side 51, while the upper-surface of the side 51 is pressed by the projecting section 6 of the mold Y, so that the aperture 13 can be transformed into an inverted-tapered shape as shown in FIG. 10(b).

Figure 11A:
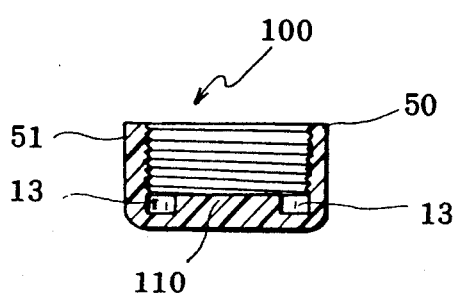
FIGS. 11(a), 11(b), and 11(c) illustrate the application of the method of FIGS. 9(a) and 9(b) for molding a cap with a seal.
Figure 11B:
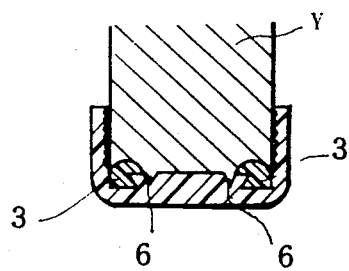
Figure 11C:
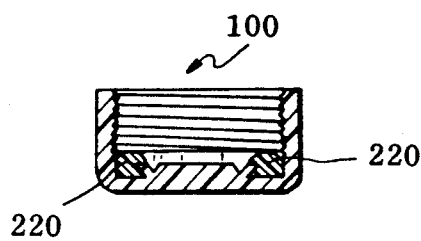
Figure 12A:
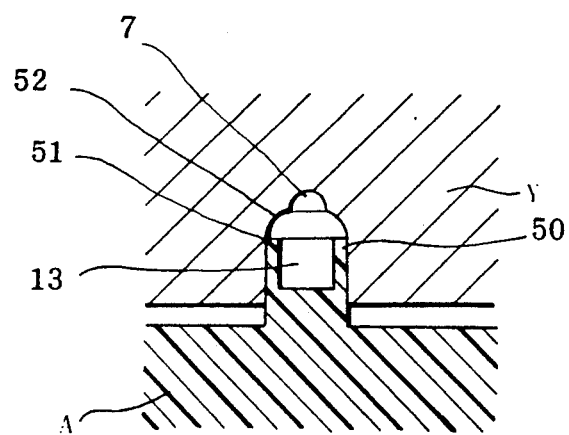
FIGS. 12(a) and 12(b) illustrate an alternate embodiment of the method of FIGS. 10(a) and 10(b)
Figure 12B:
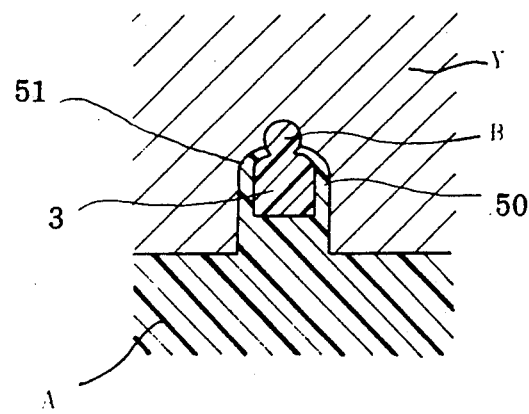

The method shown in FIGS. 9(a) and 9(b) can be applied, as shown in FIGS. 11(a), 11(b) and 11(c) to mold a cap 100 having a seal 220 on the inner bottom face thereof. Namely, it is impossible to press the upper faces of thin sides 50 and 51 of the aperture 13 of the first molded body shown in FIG. 11a, but it is possible to form the aperture section 3 (FIG. 11(b)) having the undercut section by pressing the upper-surface of one of sides 110 of the aperture 13. The method shown in FIGS. 10(a) and 10(b) can also be applied, as shown in FIGS. 12(a) and 12(b), to form the aperture section 3 having the undercut section by pressing the upper sections of the sides 50 and 51 inward by a curved face 52 of the mold Y.

Figure 13A:
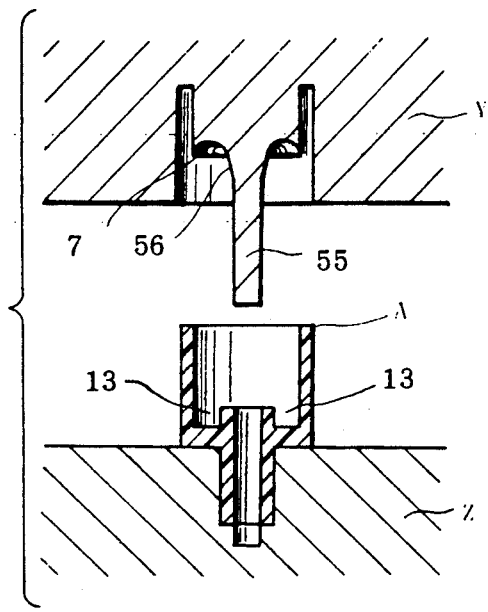
FIGS. 13(a) and 13(b) illustrate a double-pipe method for forming the aperture and undercut on the first molded body and the formation of the second molded body.
Figure 13B:
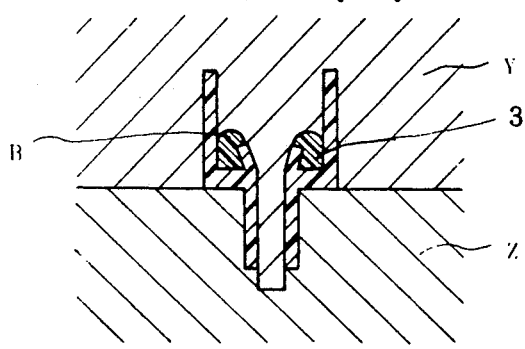
Figure 14A:
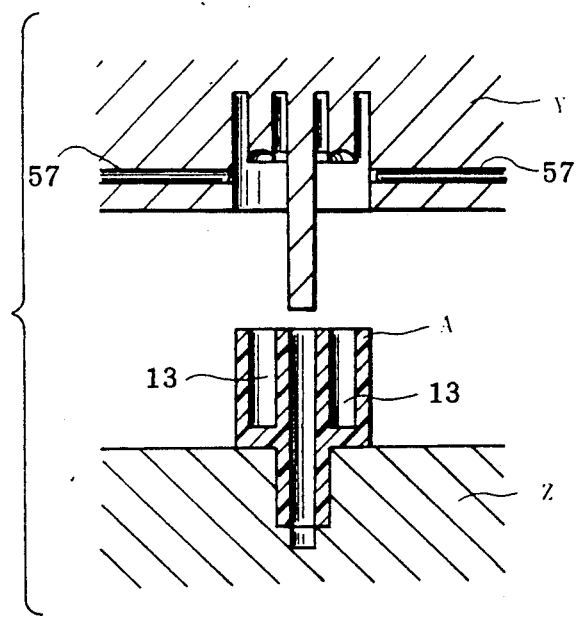
FIGS. 14(a) and 14(b) illustrate an alternate embodiment of the double-pipe method of FIGS. 13(a) and 13(b)
Figure 14B:
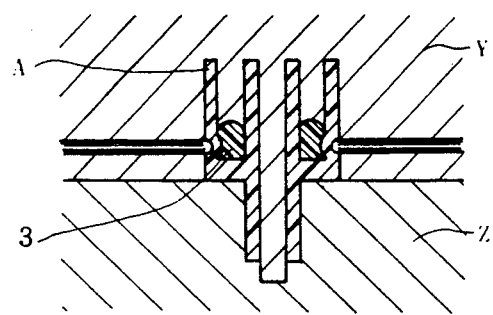

The embodiments shown in FIGS. 13(a), 13(b), 14(a), and 14(b) are methods for molding the second molded body B between an inner pipe and a outer pipe of a double pipe. If the part of the inner pipe can be transformed, as shown in FIGS. 13(a) and 13(b), it is possible to form aperture section 3 having the undercut section by transforming the part of the inner pipe outwards and therefore towards the inside of the aperture 13, by a tapered bottom section 56 of a rod-like projecting section 55 of the mold Y. If it is impossible to transform the inner pipe, as shown in FIGS. 13(a) and 13(b), it is possible to form the aperture section 3 having an undercut section by transforming the exterior wall of the part of an outer pipe toward the inside of the aperture 13 by a projecting pin 57 of the mold Y as shown in FIGS. 14(a) and 14(b).

Furthermore, a method combining the methods of FIGS. 13(a), 13(b), 14(a) and 14(b) is shown in FIGS. 15(a) and 15(b). In this method, an undercut section can be formed in the aperture section 3, and the formation of flashes can be prevented during molding of the second molded body. Note that, in the case of pressing at least one of the sides of the aperture 13, it is allowable to press all parts of the rim or only a part thereof.

Figure 16A:
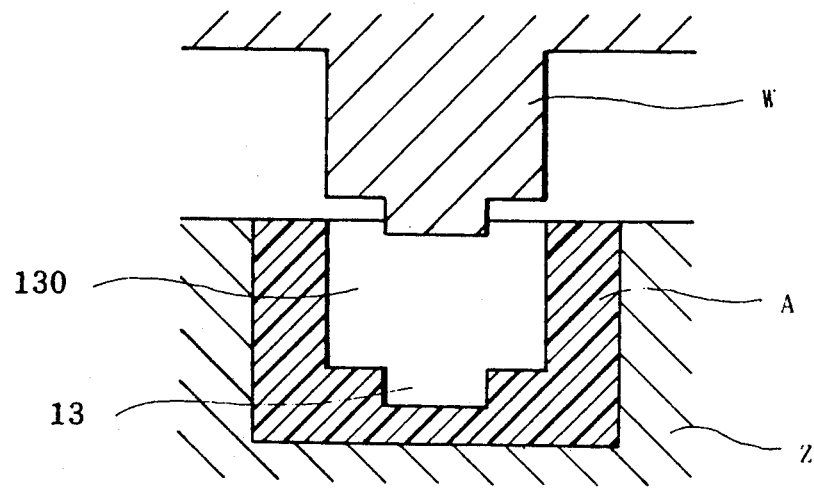
FIGS. 16(a), 16(b), and 16(c) illustrate a method for forming the aperture and undercut on the first molded body and the formation of the second molded body using a double-groove method.
Figure 16B:
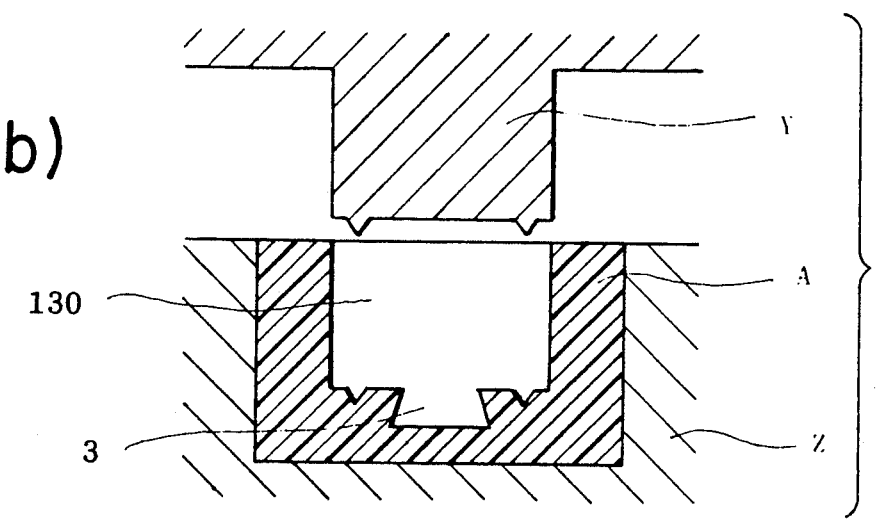
Figure 16C:
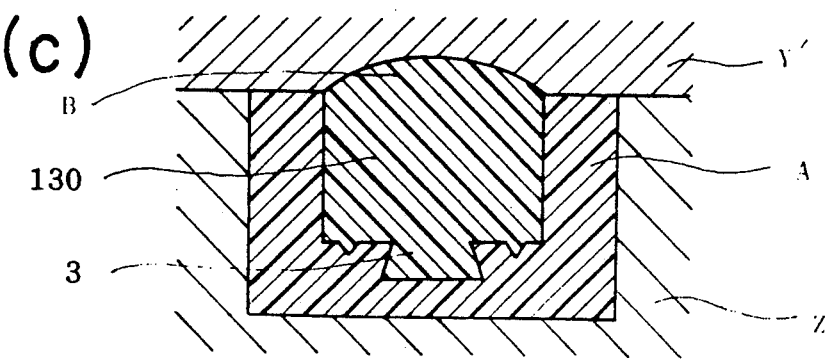

In an embodiment of the present invention as shown in FIGS. 16(a), 16(b), and 16(c), the aperture of the first molded body A consists of a wide aperture 130 and an aperture 13. Wide groove 130 and aperture 13 together form a double groove. In this case, the resin for molding the second molded body is injected into the wide groove 130 and the aperture section 3 after forming the aperture section 3 having the undercut section by the rims of the aperture 13. This method can be achieved by providing the injection hole 11 (see FIG. 6(a)) in a mold Y' (FIG. 16(c)) apart from the mold Y. Namely, it means that an additional mold Y' having the injection hole 11 is provided besides the molds W, Y and Z. First, the first molded body A having the aperture 13 like a double groove, as shown in FIG. 16(a) is molded with the molds W and Z. Next, as shown in FIG. 16(b), the undercut section is formed by pressing upon both sides of the rim of the aperture 13 of the first molded body A, which has been left in the mold Z, by the projecting sections 6 of the mold Y to force the side walls of the aperture 13 inward. Then the second resin is injected into the aperture 13 and the cavity through an injection hole 11 of a mold Y', to mold the second molded body B as shown in FIG. 16(c) after closing the molds Y' and Z, so that the first and second molded bodies A and B can be manufactured into one body.

In the above described embodiments, nylon-6 or another thermoplastic resin is used as the first resin for molding the first molded body A, and silicon gum or another thermosetting resin is used as the second resin for molding the second molded body B, since many kinds of resins are usable in the present invention. For example, polyesters, polyvinyl chloride, polyethylene, polypropylene, etc. can be used as the thermoplastic resin, and epoxy resins, unsaturated polyesters, etc. can be used as the thermosetting resin. Combinations of the first and second resins are not limited, however, to thermosetting resins and thermoplastic resins. For example, one may use different thermoplastic resins as both the first and second resin. Additionally, mutually non-compatible resins (e.g. polyester and polypropylene) can be used to mold the multi-injection molded bodies provided herein.

Figure 17:
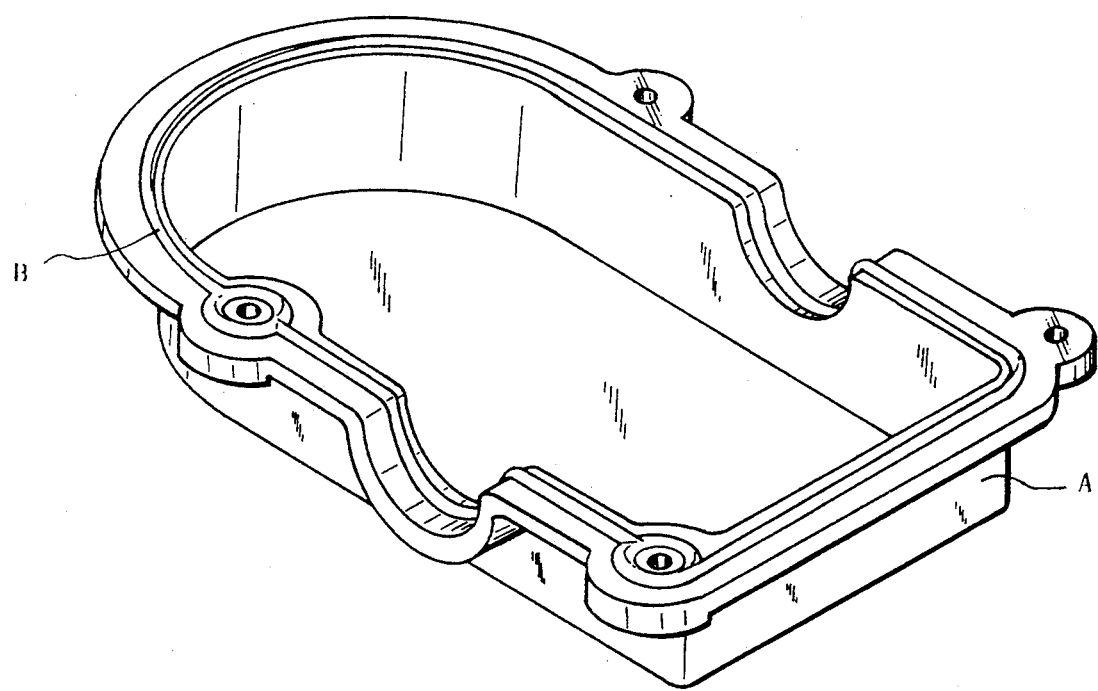
FIG. 17 shows a perspective view of another embodiment of the multi-injection molded body of the present invention.

In the present invention, it is possible to fix a sealing material as the second molded body B, such molded body B made of an elastic polymer tightly attached to a complex first molded body A as shown in FIG. 17 by injection molding. The second molded body B shown in the FIG. 17 may be used as a sealing material, an absorbing material or a nonskid material because of its elasticity.

Different and preferred kinds of elastic polymers, of course, can be used with regard to different types of anticipated uses.

In this embodiment (FIG. 17), the injection molding machine is a side stroke type whose movable board 24 moves in the horizontal direction (as shown in FIG. 6(a), for example), but the present invention can be applied to a vertical stroke type machine whose movable board moves in the vertical direction.

In the present invention, it is easy to mold a multi-injection molded body whose second molded body (e.g. sealing, absorbing or nonskid material, etc.) is tightly fixed to a complex shaped first molded body by injection molding while preventing the fomation of flashes. Therefore, the step of manually assembling the sealing material, etc. to the first molded body and the step of de-flashing can be reduced during the molding process.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A multi-injection molding machine for molding a multi-injection body, said body including at least a first molded body made of a first resin and a second molded body made of a second resin, said machine comprising a first mold having first and second mold halves forming a first mold cavity for molding said first molded body, a first injecting means for injecting said first resin into said first mold cavity, said first molded body having an aperture provided with side walls, said aperture on a surface of the first molded body, and said surface surrounding said aperture, said surface to be joined to said second molded body, a third mold half operable to be in contact with said second mold half when said second mold half is separated from said first mold half, wherein
the second mold half holds the first molded body when said second mold half is separated from said first mold half, said second mold half and said third mold half forming a second mold having a second mold cavity, said third mold half having a pressing section for pressing at least a part of the surface surrounding said aperture of said first molded body, said pressing section forcing at least one side wall of said aperture inward to form an undercut section, said third mold half accommodating said first molded body, wherein said second resin is injected into said second cavity of said third mold half and into said undercut section by way of a second injecting means.

2. The multi-injection molding machine according to claim 1, wherein said first molded body is provided with a projecting section near said aperture and said projecting section is molded onto said first molded body by said first mold.

3. The multi-injection molding machine according to claim 1, wherein at least one of said side walls of said aperture is pressed by said pressing section of said third mold half.

4. The multi-injection molding machine according to claim 1, wherein said second mold half of said first mold, in which said first molded body is left when said first mold is opened, can be combined with said third mold half.

5. The multi-injection molding machine according to claim 1, wherein said second mold half of said first mold, in which said first molded body is left when said first mold is opened, can be combined with said third mold half in which said first molded body is accommodated.

6. The multi-injection molding machine according to claim 1, wherein a pressing section is provided in said third mold half for pressing all parts of said aperture of said first molded body.

* * * * *